(12) United States Patent
Schmulenson

(10) Patent No.: US 7,607,830 B2
(45) Date of Patent: *Oct. 27, 2009

(54) HOLDER FOR AN X-RAY SENSING DEVICE

(76) Inventor: Harold K. Schmulenson, 105 Old Barn Ct., Buffalo Grove, IL (US) 60089

( * ) Notice: Subject to any disclaimer, the term of this patent is extended or adjusted under 35 U.S.C. 154(b) by 13 days.

This patent is subject to a terminal disclaimer.

(21) Appl. No.: 11/751,354

(22) Filed: May 21, 2007

(65) Prior Publication Data

US 2008/0025468 A1    Jan. 31, 2008

Related U.S. Application Data

(63) Continuation of application No. 10/985,381, filed on Nov. 11, 2004, now Pat. No. 7,226,208.

(51) Int. Cl.
*A61B 6/14* (2006.01)
(52) U.S. Cl. .................................. 378/168; 378/170
(58) Field of Classification Search ............... 378/167, 378/168, 169, 170, 189, 191
See application file for complete search history.

(56) References Cited

U.S. PATENT DOCUMENTS

| | | |
|---|---|---|
| 1,434,894 A | 11/1922 | Hawkins |
| 1,557,796 A | 10/1925 | Bonar et al. |
| 1,706,117 A | 3/1929 | Heckel |
| 2,005,993 A | 8/1935 | Heron et al. |
| 2,075,491 A | 3/1937 | Wilson |
| 2,090,933 A | 8/1937 | Bolin et al. |
| 2,239,569 A | 4/1941 | Poindexter |
| 2,240,336 A | 4/1941 | Kreider |
| 3,304,422 A | 2/1967 | Norback et al. |
| 3,356,845 A | 12/1967 | Bergendal |
| 3,473,026 A | 10/1969 | Updegrave |
| 4,075,494 A | 2/1978 | Jermyn |
| 4,150,296 A | 4/1979 | Edeland et al. |
| 4,251,732 A | 2/1981 | Fried |
| 4,295,050 A | 10/1981 | Linden |
| 4,365,162 A | 12/1982 | Jarby |
| 4,484,342 A | 11/1984 | Allison et al. |
| 4,489,427 A | 12/1984 | Allison et al. |

(Continued)

FOREIGN PATENT DOCUMENTS

DE    8701308    3/1987

(Continued)

OTHER PUBLICATIONS

Sensor and X-Ray Holder - Dec. 2004 — Dentslpy/Rinn Snap A Ray.

(Continued)

*Primary Examiner*—Chih-Cheng G Kao
(74) *Attorney, Agent, or Firm*—Rozenblat IP LLC

(57) ABSTRACT

A holder for an x-ray sensing device having a first retention member and a handle. The first retention member includes a back plate, a first retention guide, and a second retention guide. The first retention guide is connected with an end of the back plate and the second retention guide connected with an opposing end of the back plate. The first retention guide faces the second retention guide. The handle is connected with the first retention member. Preferably, the first retention member includes a retention stop on a front surface of the back plate and between the retention guides.

13 Claims, 4 Drawing Sheets

U.S. PATENT DOCUMENTS

| | | | |
|---|---|---|---|
| 4,554,676 | A | 11/1985 | Maldonado et al. |
| 4,707,847 | A | 11/1987 | Van Aken |
| 4,815,117 | A | 3/1989 | Waldo |
| 4,866,750 | A | 9/1989 | Chavarria et al. |
| 4,945,553 | A | 7/1990 | Willis |
| 4,949,370 | A | 8/1990 | Tanaka |
| 4,965,885 | A | 10/1990 | Fuhrmann |
| 5,022,065 | A | 6/1991 | Wijkstrom |
| 5,044,009 | A | 8/1991 | Klauser |
| 5,090,047 | A | 2/1992 | Angotti et al. |
| 5,289,522 | A | 2/1994 | Kanbar et al. |
| 5,327,477 | A | 7/1994 | Levy |
| 5,473,662 | A | 12/1995 | Barish |
| 5,625,666 | A | 4/1997 | Willis |
| 5,629,972 | A | 5/1997 | Hausmann et al. |
| 5,652,779 | A | 7/1997 | Levy et al. |
| 5,677,537 | A * | 10/1997 | Pfeiffer .................. 378/170 |
| 5,737,388 | A | 4/1998 | Kossila |
| 5,799,058 | A | 8/1998 | Willis et al. |
| 6,033,111 | A | 3/2000 | Winters et al. |
| 6,102,566 | A | 8/2000 | Willis |
| 6,190,042 | B1 | 2/2001 | Dove et al. |
| 6,343,875 | B1 | 2/2002 | Eppinger et al. |
| 6,461,038 | B2 | 10/2002 | Pellegrini et al. |
| 6,540,399 | B1 | 4/2003 | Eppinger et al. |
| 6,592,256 | B2 | 7/2003 | Da Rold et al. |
| 6,905,244 | B2 | 6/2005 | Kilcher et al. |
| 6,932,505 | B2 | 8/2005 | Yao et al. |
| 7,226,208 | B2 * | 6/2007 | Schmulenson .............. 378/168 |
| 2002/0076002 | A1 | 6/2002 | Eppinger et al. |
| 2002/0106057 | A1 * | 8/2002 | Halpert .................. 378/169 |
| 2003/0185347 | A1 | 10/2003 | Diederich |
| 2004/0028187 | A1 | 2/2004 | Diederich |
| 2004/0170253 | A1 | 9/2004 | Landis et al. |
| 2005/0013412 | A1 | 1/2005 | Calderwood et al. |
| 2005/0047550 | A1 | 3/2005 | Yao et al. |
| 2006/0188070 | A1 | 8/2006 | Razzano et al. |
| 2007/0280424 | A1 | 12/2007 | Schmulenson et al. |
| 2008/0025468 | A1 | 1/2008 | Schmulenson et al. |

OTHER PUBLICATIONS

Sensor Mounted in X-Ray Holder - Dec. 2004 — Dentslpy/Rinn Snap A Ray.
Uni-bite Film Holder - Unident - "American Dental Accessories Catalog" — Summer 2005.
X-Ray Holders - "American Dental Accessories Catalog" - Summer 2005.
Sensor-Pro Digital Sensor Holder - Op-de_Op Sensor Pro - "American Dental Accessories Catalog" - Summer 2005.
Sensor (black) Next to Standard X-Ray - Dec. 2004 — Dentslpy/Rinn Snap A Ray.
Sensor Mounted in X-Ray Holder - Dec. 2004 — Dentslpy/Rinn Snap A Ray.
International Search Report and Written Opinion dated Feb. 14, 2006 for PCT application No. PCT/US2005/040854.
International Search Report and Written Opinion dated Mar. 5, 2007 for PCT application No. PCT/US2006/033028.

* cited by examiner

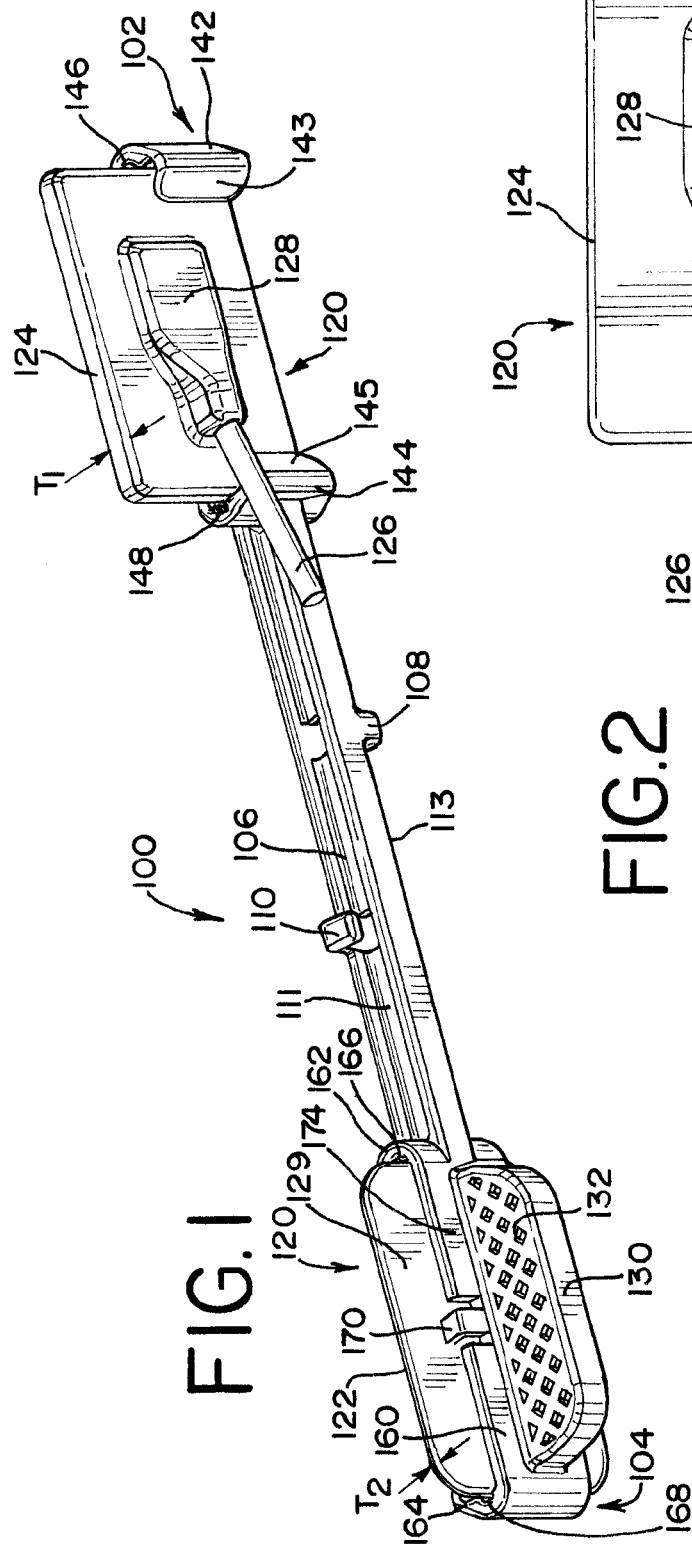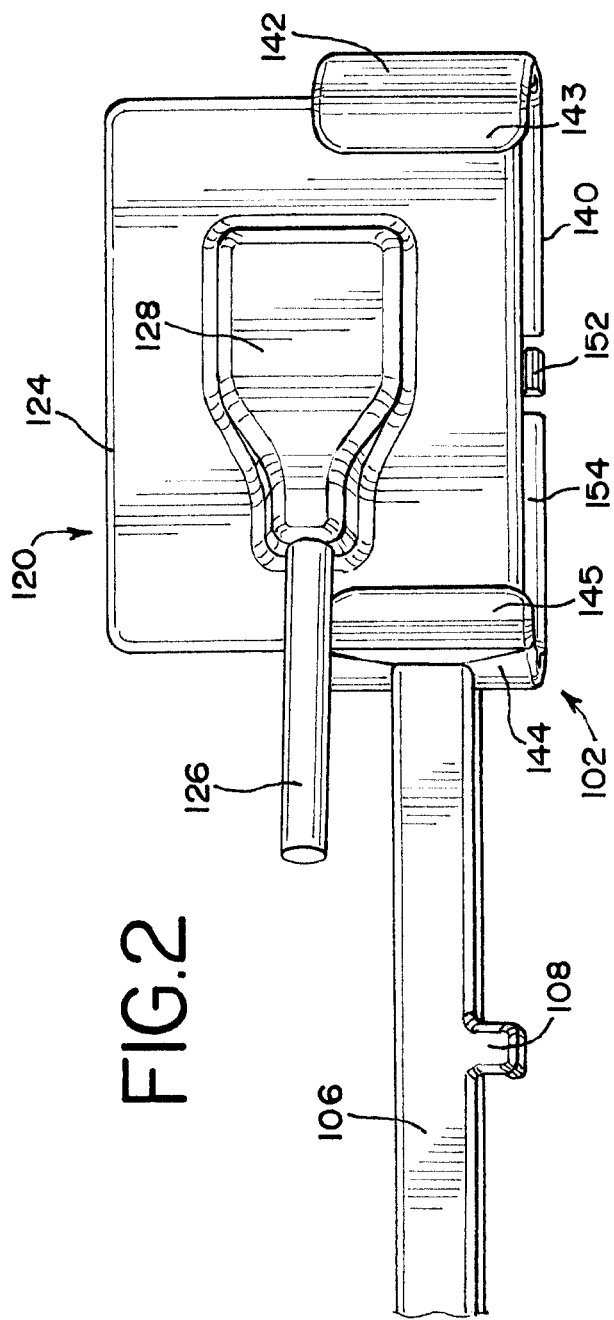

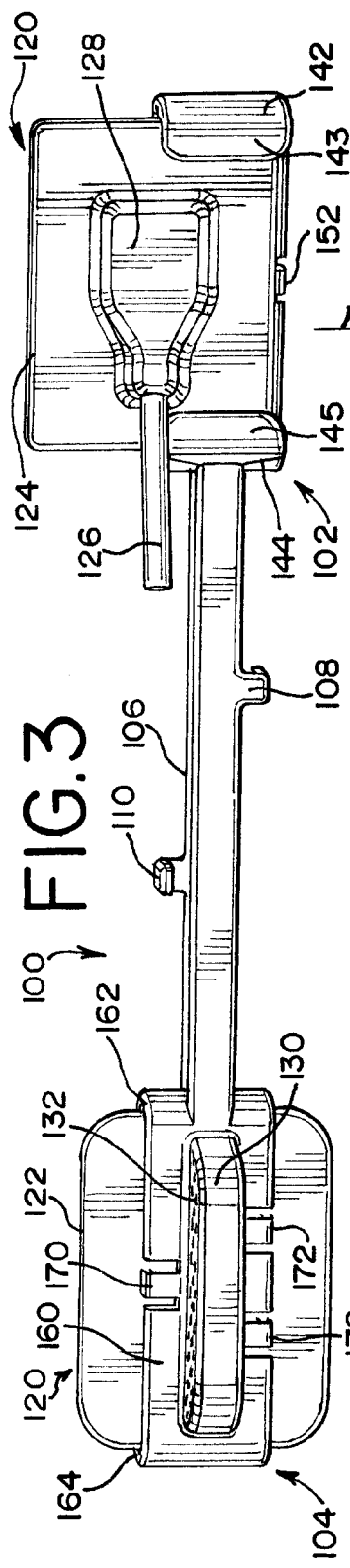
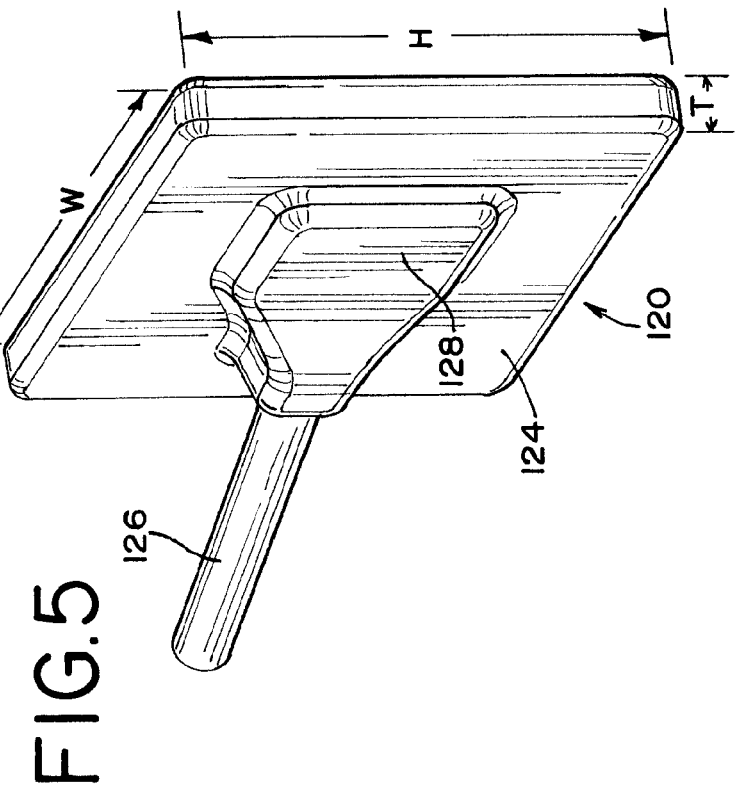
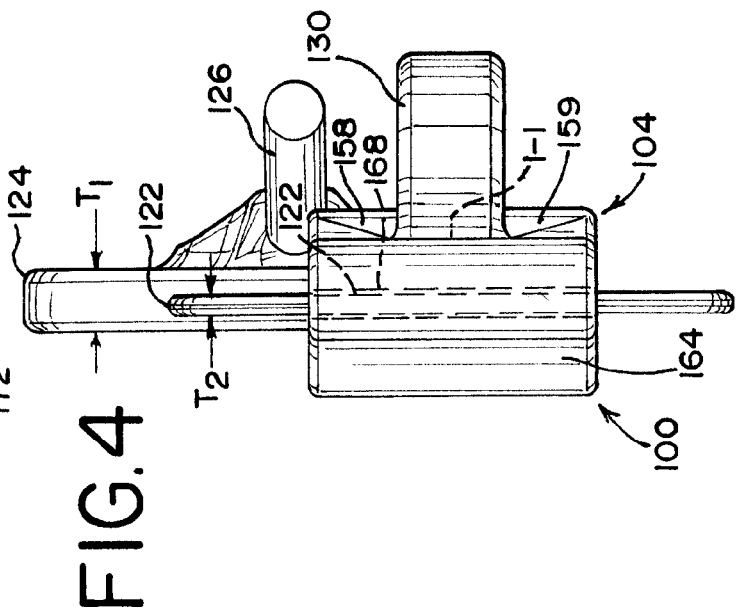
FIG. 3
FIG. 5
FIG. 4

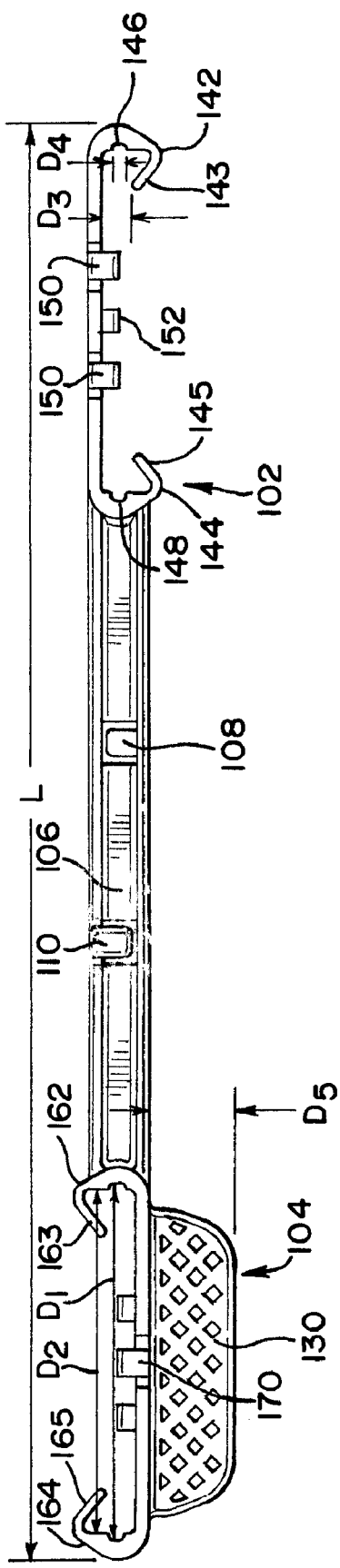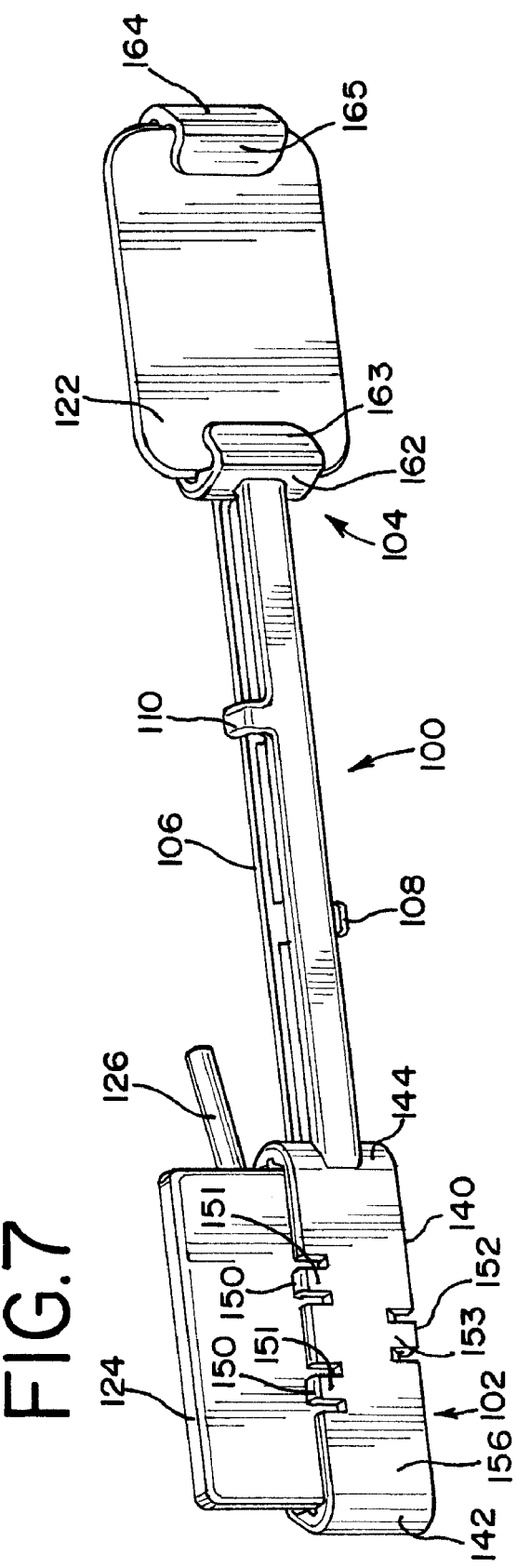

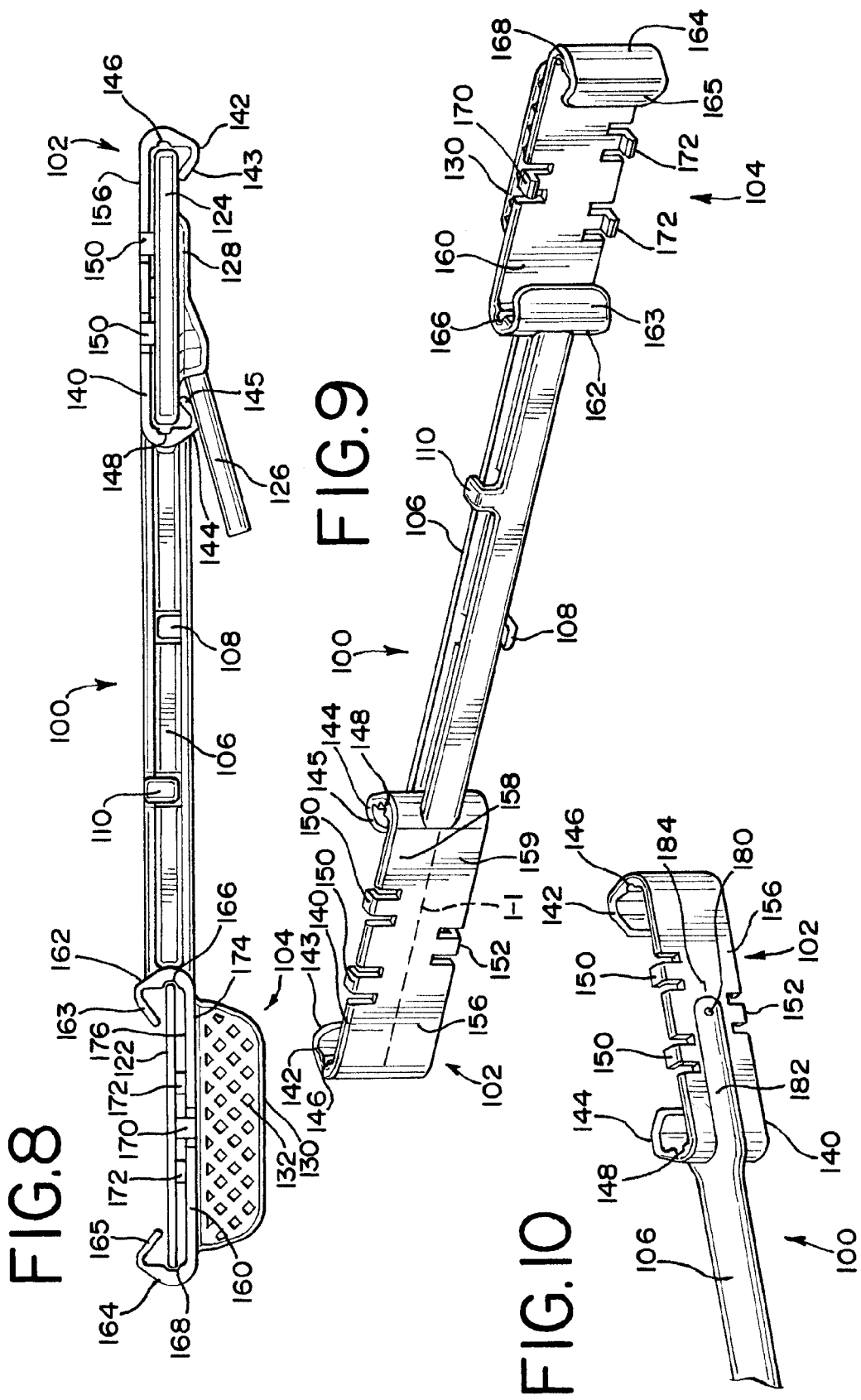

HOLDER FOR AN X-RAY SENSING DEVICE

CROSS-REFERENCE TO RELATED APPLICATIONS

This continuation application claims the benefit and priority of U.S. patent application Ser. No. 10/985,381, filed Nov. 11, 2004 now U.S. Pat. No. 7,226,208, which is incorporated by reference in its entirety.

BACKGROUND

This invention relates generally to sensor holders, and in particular, to a holder for a dental x-ray sensing device.

Dental radiographs are made using x-ray examination units, often including an x-ray cone or tube positioned proximate the patient and aligned to take x-rays of certain teeth. Dental x-ray sensing devices, which include including x-ray film units, digital x-ray sensors, charge coupled devices, phosphor imaging plates or the like, often have a generally flat or plate-like configuration and standardized dimensions so that the sensing device can be placed into the oral cavity.

The sensing device is placed into the patient's mouth and held in place proximate to the tooth or teeth to be examined. The x-ray's are directed through the target teeth and then through the sensor. It has been found that proper orientation of the sensor is required to eliminate distortions and improper focus.

To ensure proper orientation of the sensing device, sensor carriers or holders with "bite blocks" have been developed. These devices often have a plate for holding the sensing device and a bite block that the patient bites down upon to position the device and the carried sensor. A bite block is shown for example, in U.S. Pat. No. 3,473,026.

Different sensing devices are often used depending upon the area of the mouth to be examined. This may include for example, endo, posterior, anterior, left, right, upper and lower bite wings, and the like. Known bite blocks and sensor holders have been individually designed and manufactured for each different type of sensing device. The dimensions of the sensing device and the holder dictate the degree of secured positioning of the sensing device in the holder.

A dental professional may have a large number of x-ray sensing devices with varying sizes and shapes, and hence, a similarly large number of sensor holders. The dental professional is often faced with employing a different sensing device or set of sensing devices, holders and bite blocks depending upon the particular x-ray procedure being employed and the area of the mouth to be examined. At best, it is time consuming to change between sensing devices, sensor holders and bite blocks.

Additionally, some of the known sensor holders are fairly complex in design, and therefore may be relatively costly to manufacture, see for example U.S. Pat. No. 4,965,885. Since some of the sensor holders may not be inexpensive, they must be reused instead of disposed of. In order to reuse the holders, they typically need to be decontaminated and sterilized, or covered, every time they are inserted into a patient's mouth, which can be a rather cumbersome procedure.

Many of the sensor holders were designed for use with x-ray film units, which are more robust, and therefore they may damage a digital x-ray sensor, which is more fragile. Since the digital x-ray sensors can be relatively expensive, much care must be used when using them with many of the current sensor holders.

A need exists therefore, for a sensor holder which can accommodate different sizes and shapes of sensing devices. It has also been found that a need exits for a sensor holder which can hold a sensing device in a variety of positions so that different areas of the mouth may be examined using only one sensor holder. A need also exists for a sensor holder which can be manufactured at a lower cost, thus allowing the user to dispose of the holder. Additionally, a need exists for an improved sensor holder which prevents damage to digital x-ray sensors.

SUMMARY

The present invention is defined by the following claims, and nothing in this section should be taken as a limitation on those claims. By way of introduction, the preferred embodiments described below relate to a holder for an x-ray sensing device having a first retention member and a handle. The first retention member includes a back plate, a first retention guide, and a second retention guide. The first retention guide is connected with an end of the back plate and the second retention guide connected with an opposing end of the back plate. The first retention guide faces the second retention guide. The handle is connected with the first retention member. Preferably, the first retention member includes a retention stop on a front surface of the back plate and between the retention guides.

The preferred embodiments further relate to a holder for an x-ray sensing device having a handle, a first retention member, and a second retention member. The first retention member includes a first back plate, a first retention guide connected with an end of the first back plate and a second retention guide connected with an opposing end of the first back plate. The first retention guide faces to the second retention guide. The second retention member includes a second back plate, a third retention guide connected with an end of the second back plate and a fourth retention guide connected with an opposing end of the second back plate. The third retention guide faces to the fourth retention guide. The first retention member is connected with one end of the handle and the second retention member is connected with an opposing end of the handle.

The preferred embodiments further relate to a holder for an x-ray sensing device having a handle and a retention member. The retention member includes a back plate, a first retention guide connected with an end of the back plate and a second retention guide connected with an opposing end of the back plate. The first retention guide faces to the second retention guide. Each retention guide forms a generally u-shaped cross-section for receiving an x-ray sensor unit and a retention groove for receiving an x-ray film unit.

DESCRIPTION OF THE DRAWINGS

FIG. 1 depicts a perspective view of a holder for an x-ray sensor and/or an x-ray film unit, in accordance with one preferred embodiment of the invention.

FIG. 2 depicts an enlarged partial perspective view of a holder for an x-ray sensor and/or an x-ray film unit holding an x-ray sensor, in accordance with one preferred embodiment of the invention.

FIG. 3 depicts an enlarged partial perspective view of a holder for an x-ray sensor and/or an x-ray film unit holding an x-ray film unit, in accordance with one preferred embodiment of the invention.

FIG. 4 depicts side view of a holder for an x-ray sensor and/or an x-ray film unit holding an x-ray sensor, in accordance with one preferred embodiment of the invention.

FIG. 5 depicts a perspective view an x-ray sensor, in accordance with one preferred embodiment of the invention.

FIG. 6 depicts a top view a holder for an x-ray sensor and/or an x-ray film unit, in accordance with one preferred embodiment of the invention.

FIG. 7 depicts a perspective view a holder for an x-ray sensor and/or an x-ray film unit, in accordance with one preferred embodiment of the invention.

FIG. 8 depicts a top view a holder for an x-ray sensor and/or an x-ray film unit, in accordance with one preferred embodiment of the invention.

FIG. 9 depicts a perspective view a holder for an x-ray sensor and/or an x-ray film unit, in accordance with one preferred embodiment of the invention.

FIG. 10 depicts a partial perspective view a holder for an x-ray sensor and/or an x-ray film unit, in accordance with one preferred embodiment of the invention.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION

Referring to FIG. 1, there is shown a perspective view of a holder 100 for an x-ray sensing device 120, according to one preferred embodiment. The holder 100 is designed to hold and retain the x-ray sensing device 120 in a multitude of positions. Preferably, the holder 100 is manufactured using an injection molded process in order to reduce costs. However, holder 100 can be manufactured in one of many ways. For example, holder 100 may be machined, thermoformed, and hand-made. Preferably, in order to reduce costs and maintain rigidity, holder 100 is a one-piece unit which is integrally formed. However, holder 100 may comprise multiple parts which are then assembled and fitted together. Preferably, holder 100 is constructed from a rigid yet somewhat flexible material, such as but not limited to: metals such as iron, steel, stainless steel, aluminum, silver, titanium, and brass; plastics, such as ethylene, vinyl, acetate; acrylics, such as acrylonitrol-butadine-styrene; resins; and polymers such as polycarbonate. The holder 100 may be colored any one of various different colors depending on the size and type of sensors used. For example, the holder may be colored white for a size two x-ray film unit or colored green for a size zero x-ray film unit.

X-ray sensing device 120 is any device which can be used to sense radiation, and preferably x-ray radiation. As illustrated in FIGS. 1-5, x-ray sensing device 120 includes such devices as an x-ray film unit 122, which uses x-ray film 129 to detect x-rays, an x-ray sensor unit 124, which uses a digital x-ray sensor 128 or a charge coupled device to detect x-rays, a phosphor imaging plate or the like. X-ray sensor unit 124 may include a wire 126 which is used to provide power and/or transfer signals between the digital x-ray sensor 128 and a control unit, not shown. Preferably, x-ray sensing device 120 is a dental x-ray sensing device which is sized for use in the mouth of a patient in order to take x-ray scans of a patient's teeth.

The holder 100 includes a first retention member 102 and a handle 106 connected with the first retention member 102, as illustrated in FIGS. 1-3. The first retention member 102 includes a back plate 140, a first retention guide 142, and a second retention guide 144, as illustrated in FIGS. 1, 7, and 9. The first retention guide 142 is connected with an end of the back plate 140 and the second retention guide is connected with an opposing end of the back plate 140. The first retention guide 142 faces the second retention guide 144. Preferably, the back plate 140, the first retention guide 142, and the second retention guide 144 are integrally formed, as shown in FIGS. 1, 7, and 9. Preferably, each retention guide 142, 144 forms a generally u-shaped cross section.

More preferably, each retention guide 142, 144 forms a generally u-shaped cross section having a gripping portion 143, 145, respectively, wherein each gripping portion 143, 145 curves inwards towards the back plate 140, as illustrated in FIGS. 1, 6, 8, and 9. The gripping portions 143, 145 help to better hold the x-ray sensing device 120 in place and allow the holder 100 to accommodate a wide variety of x-ray sensing devices with varying thicknesses, such as both x-ray film units 122 and x-ray sensor units 124, as illustrated in FIGS. 1 and 8, or such as x-ray sensor units of varying thicknesses. Preferably, the gripping portions 143, 145 are apply enough pressure on the x-ray sensing device 120 to hold the device 120 in place without damaging the device 120. With this configuration, holder 100 can receive the x-ray sensing device 120, by sliding the x-ray sensing device 120 in between the first retention guide 142 and the second retention guide 144 and against the back plate 140, as illustrated in FIGS. 1-3.

Preferably the retention guides 142, 144 are sized such that x-ray sensing device 120 fits firmly between the first retention guide 142 and the second retention guide 144 and against the back plate 140, as illustrated in FIGS. 1, 2, 8, and 9. Preferably each retention guide 142, 144 extends from an upper portion of the back plate 140 to a lower portion of the back plate 140, as illustrated in FIGS. 4 and 9. As defined herein, an upper portion of the back plate 140 is a portion of the back plate 140 that is within an upper half 158 of the back plate 140 and a lower portion of the back plate 140 is a portion of the back plate 140 that is within a lower half 159 of the back plate 140. Dividing the back plate 140 into two halves, wherein each half extends from the first retention guide 142 to the second retention guide 144, one half is the upper half 158 and the opposing half is the lower half 159, as illustrated in FIGS. 4 and 9, wherein the back plate 140 is divided into halves by imaginary line 1-1 located centrally in back plate 140.

In one embodiment the first retention member 102 includes a retention stop, such as an upper retention stop 150, on a front surface 154 of the back plate 140. The retention stop is preferably between the retention guides 142, 144, as illustrated in FIGS. 6-9. Preferably the first retention member 102 comprises an upper retention stop 150 connected with an upper portion of the back plate 140, and a lower retention stop 152 opposed to the upper retention stop 150 and connected with a lower portion of the back plate 140. Preferably both the upper and lower retention stops, 150, 152 are located between the retention guides 142, 144. The retention stops 150, 152 include a portion which extends away from the back plate 140 and allow for a user to position the x-ray sensing device 120 either towards the bottom portion of the back plate 140, or towards the upper portion of the back plate 140, as illustrated in FIGS. 2 and 7. By allowing a user to change the position of the x-ray sensing device 120 in this way, the holder 100 allows a user to position the x-ray sensing device 120 more accurately when x-ray either the upper or lower teeth in a patient's mouth. Preferably, each retention stop 150, 152 extends in a direction from the first retention guide 142 to the second retention guide 144, as illustrated in FIG. 7.

Preferably, the first retention member 102 includes flexible members 151, 153 attached to each retention stop 150, 152, respectively, at one end and attached to the back plate 140 at a second end, as illustrated in FIG. 7. The flexible members 151, 153 may be formed in the back plate 140, or may be formed on the back plate 140, and allow the retention stops 150, 152 to move back and forth upon insertion of an x-ray sensing device 120 into the first retention member 102. Additionally, by allowing the retention stops 150, 152 to move back and forth, the flexible members 151, 153 also allow the retention stops 150, 152 to apply an appropriate amount of pressure on the x-ray sensing device 120, such that the x-ray sensing device 120 is held in place yet not damaged. In one embodiment, the first retention member 102 includes more than one upper retention stop 150, as illustrated in FIG. 7. The additional retention stop 150 allows for better placement of the x-ray sensing device 120.

In one embodiment, each retention guide 142, 144 forms a retention groove 146, 148 for receiving an x-ray film unit 122, as illustrated in FIGS. 1, 4, and 6, and 8. The retention grooves 146, 148 forms a u-shape cross section which is smaller than the u-shaped cross section formed by each retention guide 142, 144. By forming a smaller u-shaped cross section, the retention grooves 146, 148 are better able to receive an x-ray film unit 122, since generally, the x-ray film unit 122 has a smaller thickness $T_2$ than a thickness $T_1$ of the x-ray sensor unit 124, as illustrated in FIG. 1. In this manner by using retention grooves 146 and 148, a single retention member 102, 104 is able to accommodate both an x-ray film unit 122 and an x-ray sensing device 120, as illustrated in FIGS. 1 and 8.

In one embodiment, the holder 100 includes a first wire retention member 108 on the handle 106, as illustrated in FIG. 1. Wire retention member 108 is able to accommodate and grasp a wire such as the wire 126 found in x-ray sensor unit 124. Preferably, the handle 106 also includes a groove 113 in which wire can reside in. Working in conjunction with wire retention member 108, groove 113 is able to accommodate and secure a wire such as the wire 126 found in x-ray sensor unit 124, therefore preventing the wire from becoming tangled within a user's mouth. Preferably, the wire retention member 108 is formed on the handle 106 adjacent the first retention member 102.

In one embodiment, the holder 100 includes a second wire retention member 110 on the handle 106, as illustrated in FIG. 1. Wire retention member 110 is able to accommodate and grasp a wire such as the wire 126 found in x-ray sensor unit 124. Preferably, the handle 106 also includes a groove 111 in which wire can reside in. Working in conjunction with wire retention member 110, groove 111 is able to accommodate and secure a wire such as the wire 126 found in x-ray sensor unit 124, therefore preventing the wire from becoming tangled within a user's mouth. Preferably, the wire retention member 110 is formed on the handle 106 adjacent a second retention member 104.

In one embodiment, the holder 100 includes a second retention member 104 connected with the handle 106, wherein the second retention member 104 is opposed to the first retention member 102. The second retention member 104 functions essentially the same way as the first retention member 102 and may include many of the same elements as found in the first retention member 102. In one embodiment, the second retention member 104 includes a back plate 160, retention guides 162, 164, gripping portions 163, 165, retention grooves 166, 168, an upper retention stop 170, and a lower retention stop 172, as illustrated in FIGS. 1, 3, and 6-9. Preferably, the first retention member 102 is connected with one end of the handle 106 and the second retention member 104 is connected with an opposing end of the handle 106 as illustrated in FIG. 1. Preferably, the first and second retention members 102, 104 are each sized differently so that each retention member 102, 104 can accept an x-ray sensing device 120 of a different size. For example, in one embodiment the first retention member 102 may be sized to accept a first x-ray sensing device 120 and a second retention member 104 may be sized to accept a second x-ray sensing device 120, wherein the size of the first x-ray sensing device 120 is not equal to the size of the second x-ray sensing device 120.

In one embodiment, the holder 100 comprises a bite block 130 on a back surface 174 of the back plate 160, wherein the back surface 174 opposes a front surface 176, as illustrated in FIGS. 1 and 8. The bite block 130 is preferably positioned centrally on the back plate between the upper retention slot 170 and lower retention slot 172 as illustrated in FIG. 3. When the holder 100 is inserted into a patient's mouth, the patient is able to bite down with the patient's teeth on the bite block 130 and engage the first retention member 102. The bite block 130 allows for more accurate positioning of the holder 100, and more specifically the first retention member 102 and the sensor 120, within a patient's mouth. Preferably, the bite block 130 includes a series of serrations 132, as illustrated in FIGS. 1 and 6, in order to provide additional grip and less movement for the holder 100 within the patient's mouth. Preferably, the serrations 132 are diamond shaped and are indented into the bite block.

As illustrated in FIG. 6, the length L from one end of the holder 100 to another end of the holder 100 in a direction from a first retention member to a second retention member 104, is approximately between 5 and 50 centimeters and more preferably between 10 and 30 centimeters and most preferably between 15 and 25 centimeters. Additionally, the distance $D_1$ between a first retention groove 146 and a second retention groove 148 is preferably between 3 and 8 centimeters. Additionally, a distance $D_2$ between a first retention guide 142 and a second retention guide 144, as illustrated in FIG. 6, is preferably between 3 and 8 centimeters. A distance $D_3$ between the back plate 140 and a far end of a retention guide 142, 144, as illustrated in FIG. 6, is preferably between 1 and 20 millimeters, and more preferably, between 2 to 10 millimeters, and a distance $D_4$ between one end of the retention groove and a second end of the retention groove, as illustrated in FIG. 6, is approximately between 0.1 and 4 millimeters, and more preferably, between 0.5 and 3 millimeters. A distance $D_5$ from the back surface of the back plate 140 to a distal surface of the bite block 130, as illustrated in FIG. 6, is preferably between 1 and 3 centimeters.

X-ray sensing devices 120 can vary in width W, height H and thickness T as illustrated in FIG. 5. Preferably the width W of the x-ray sensing device 120 is between 3 and 8 centimeters. Also preferably the height H of the x-ray sensing device 120 is between 1 and 4 centimeters and the thickness T is preferably between 0.1 and 20 millimeters, and more preferably, between 1 to 10 millimeters.

In one embodiment, the holder 100 includes a pivoting member 182 attached to the back plate 140 of the first retention member 102 at a pivot point 180 and connected with the handle 106, as illustrated in FIG. 10. The pivoting member 182 allows the first retention member 102 to be pivoted at the pivot point 180, thus providing the holder 100 with the ability to rotate the retention member 102 at a variety of angles with respect to the handle 106. The pivoting member 182 also provides the user with a variety of configurations in which the holder may be placed, and therefore provides the user with additional flexibility when positioning the holder 100, and more specifically, the retention member 102. Preferably, the back plate 140 includes a series of stops 184 projecting radially outwards from the pivot point 180. The stops 184 may either be in the form of grooves formed in the back surface 156 or in the form of projections formed on the back surface 156. The stops 184 engage the pivoting member 182 and stop the pivoting member 182 from pivoting at preselected angles with respect to the handle 106, as illustrated in FIG. 10.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention.

What is claimed is:

1. A holder for an x-ray sensing device having a retention member, the retention member comprising:
    a back plate;
    a first retention guide connected with a first end of the back plate;
    a second retention guide connected with a second end of the back plate opposed to the first end, wherein the first retention guide faces the second retention guide; and
    an upper retention stop connected with the back plate and between the retention guides, wherein the retention member is configured to hold the x-ray sensing device in a central position between the first and second retention guides and against the upper retention stop, and configured to hold the x-ray sensing device in a lower position wherein a top edge of the x-ray sensing device abuts the upper retention stop.

2. The holder for an x-ray sensing device of claim 1, wherein the x-ray sensing device is movable from the central position to the upper position.

3. The holder for an x-ray sensing device of claim 1, wherein the x-ray sensing device is movable from the central position to the upper position without having to remove the x-ray sensing device from the holder.

4. The holder for an x-ray sensing device of claim 1, wherein the upper retention stop is opposed to a lower retention stop, and wherein the upper and lower retention stops are located between the retention guides.

5. The holder for an x-ray sensing device of claim 4, wherein the retention member is configured to hold the x-ray sensing device in an upper position wherein a bottom edge of the x-ray sensing device abuts the lower retention stop.

6. The holder for an x-ray sensing device of claim 1 further comprising a flexible member attached to the upper retention stop at a first end and to the back plate at a second end.

7. The holder for an x-ray sensing device of claim 1, wherein each retention guide only extends from an upper portion of the back plate to a lower portion of the back plate.

8. A holder for an x-ray sensing device having a retention member, the retention member comprising:
    a back plate;
    a first retention guide connected with a first end of the back plate; and
    a second retention guide connected with a second end of the back plate opposed to the first end, wherein the first retention guide faces the second retention guide, wherein the first retention guide includes a gripping portion which curves inwards towards the back plate, wherein the retention member is configured to receive the x-ray sensing device by sliding the x-ray sensing device in between the first and second retention guides and against the back plate, wherein the gripping portion is moveable from a first position which is closest to the back plate and a second position which is further away from the back plate than the first position, and wherein the gripping portion is pivotable at where the gripping portion curves inwards.

9. The holder for an x-ray sensing device of claim 8, wherein the first retention guide forms a bend from which the gripping portion extend.

10. The holder for an x-ray sensing device of claim 9, wherein the gripping portion extends in a generally linear direction from the bend.

11. The holder for an x-ray sensing device of claim 8 further comprising upper and lower retention stops located between the retention guides.

12. The holder for an x-ray sensing device of claim 8 further comprising a wire retention member on a handle connected with the retention member.

13. The holder for an x-ray sensing device of claim 8, wherein each retention guide only extends from an upper portion of the back plate to a lower portion of the back plate.

* * * * *